US008830236B2

(12) United States Patent
Germann et al.

(10) Patent No.: US 8,830,236 B2
(45) Date of Patent: Sep. 9, 2014

(54) METHOD FOR ESTIMATING A POSE OF AN ARTICULATED OBJECT MODEL

(75) Inventors: Marcel Germann, Zurich (CH); Stephan Wuermlin Stadler, Zurich (CH); Richard Keiser, Zurich (CH); Remo Ziegler, Uster (CH); Christoph Niederberger, Basel (CH); Alexander Hornung, Zurich (CH); Marcus Gross, Uster (CH)

(73) Assignee: Liberovision AG, Zurich (CH)

( * ) Notice: Subject to any disclaimer, the term of this patent is extended or adjusted under 35 U.S.C. 154(b) by 566 days.

(21) Appl. No.: 13/096,488

(22) Filed: Apr. 28, 2011

(65) Prior Publication Data
US 2011/0267344 A1    Nov. 3, 2011

(30) Foreign Application Priority Data
Apr. 30, 2010   (EP) .................................... 10405091

(51) Int. Cl.
*G06T 17/00*   (2006.01)
(52) U.S. Cl.
USPC ........................... 345/420; 345/419; 345/547
(58) Field of Classification Search
None
See application file for complete search history.

(56) References Cited

U.S. PATENT DOCUMENTS

| | | | | |
|---|---|---|---|---|
| 6,035,067 | A * | 3/2000 | Ponticos | 382/226 |
| 7,853,038 | B2 * | 12/2010 | Lee | 382/100 |
| 2005/0185823 | A1 * | 8/2005 | Brown et al. | 382/103 |
| 2009/0232353 | A1 * | 9/2009 | Sundaresan et al. | 382/103 |

FOREIGN PATENT DOCUMENTS

EP       1043689      10/2000

OTHER PUBLICATIONS

In Kyu Park, et al.; Fast and automatic object pose estimation for range images on the GPU; Machine Vision and Applications, Aug. 2009.
Hayashi K, et al.; Synthesizing Free-Viewpoint Images from Multiple Vew Videos in Soccer Stadium,Computer Graphics, Imaging and Visualisation; 2006.
Waschbusch M., et al; 3d Video Billboard Clouds, Eurographics 2007.
Amaury Aubel, et al; Real-Time Display of Virtual Humans: Levels of Details and Imposters; IEEE Transaction on Circuits and Systems for Video Technology; Mar. 2000.
Carranza, J., et al; Free-Viewpoint Video of Human Actors; 2003.

* cited by examiner

*Primary Examiner* — Said Broome
(74) *Attorney, Agent, or Firm* — Rankin, Hill & Clark LLP

(57) ABSTRACT

A computer-implemented method for estimating a pose of an articulated object model that is a computer based 3D model of a real world object observed by one or more source cameras, including the steps of obtaining a source image from a video stream; processing the source image to extract a source image segment maintaining, in a database, a set of reference silhouettes, each being associated with an articulated object model and a corresponding reference pose; comparing the source image segment to the reference silhouettes and selecting reference silhouettes by taking into account, for each reference silhouette, a matching error that indicates how closely the reference silhouette matches the source image segment retrieving the corresponding reference poses of the articulated object models; and computing an estimate of the pose of the articulated object model from the reference poses of the selected reference silhouettes.

15 Claims, 4 Drawing Sheets

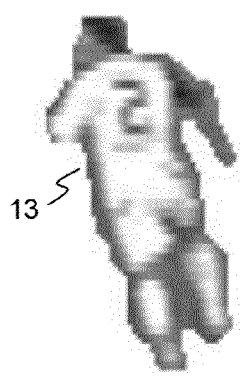 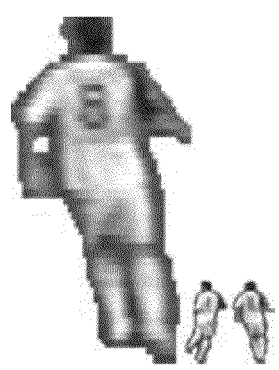 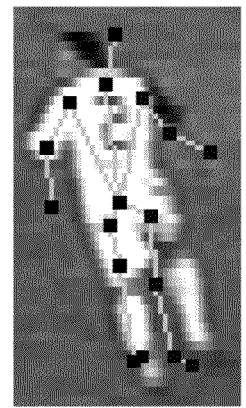
Fig. 3a   Fig. 3b   Fig. 3c
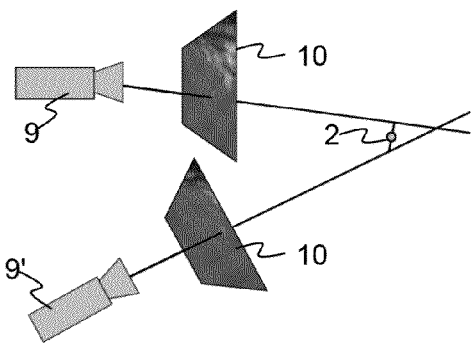
Fig. 4
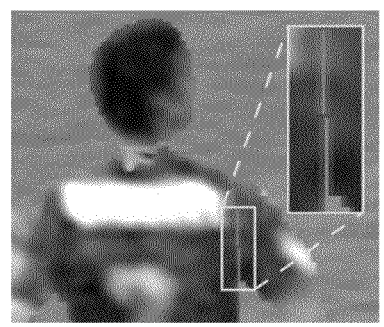
Fig. 8b
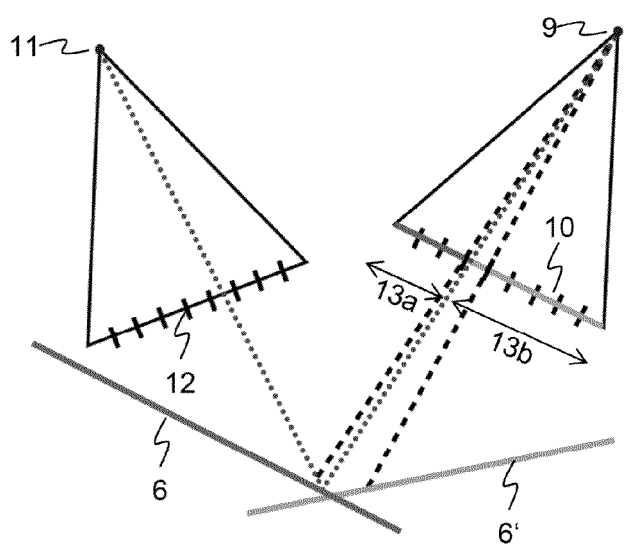
Fig. 8a
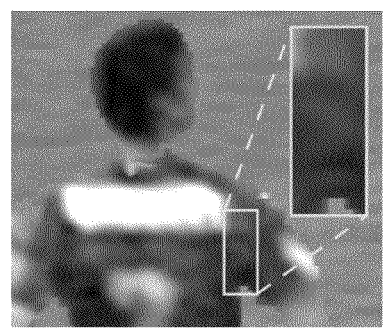
Fig. 8c

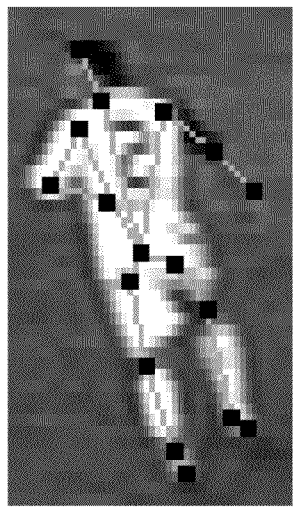 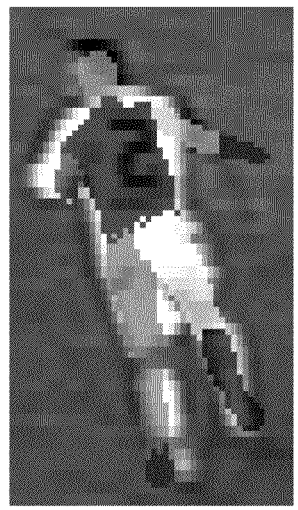 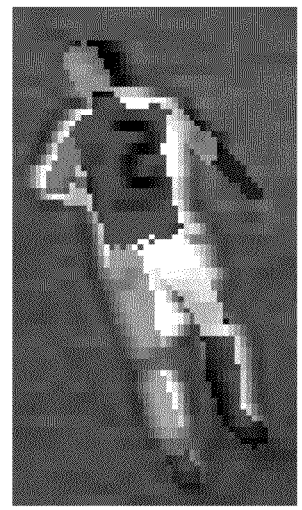
Fig. 5a　　　　　　Fig. 5b　　　　　　Fig. 5c
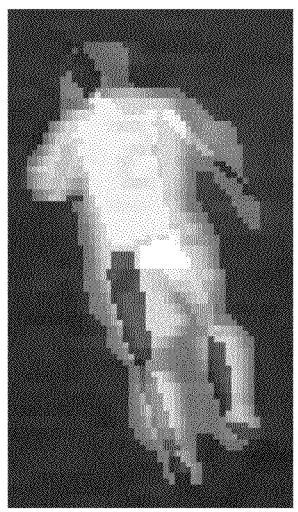 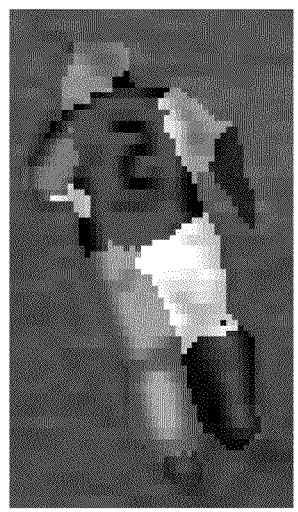 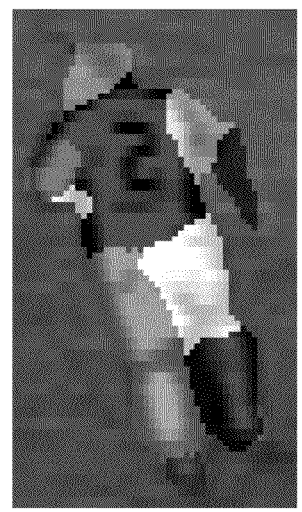
Fig. 6a　　　　　　Fig. 6b　　　　　　Fig. 6c
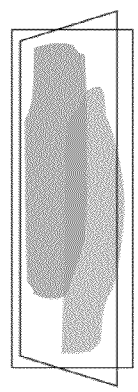 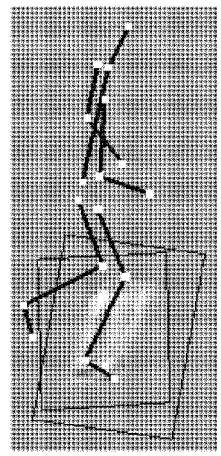 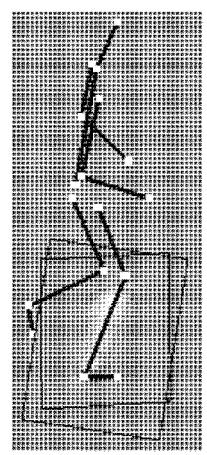
Fig. 7a　　　　　　Fig. 7b　　　　　　Fig. 7c

METHOD FOR ESTIMATING A POSE OF AN ARTICULATED OBJECT MODEL

FIELD OF THE INVENTION

The invention relates to the field of video image processing. It relates to a method for estimating a pose of an articulated object model, a method for rendering a virtual image as seen from a virtual camera, and a method for determining a segmentation of a source image segment, as described in the preamble of the corresponding independent claims.

BACKGROUND OF THE INVENTION

Image-based rendering (IBR) was introduced in the pioneering work of Levoy et al. [LH96] and Gortler et al. [GGSC96]. The basic goal is simple: IBR strives to create a sense of a 3D real-world scene based on captured image data. Many subsequent works have explored the theoretical foundations, e.g., the dependency of geometry and images in respect to a minimal sampling requirement [CCST00], or developed more efficient and less restrictive implementations [BBM*01]. One important general insight from these works is that a sufficiently accurate geometric proxy of the scene reduces the number of required input images considerably.

A small number of input views is an important prerequisite in order to apply IBR in real-world environments and applications. One prominent example is sports broadcasting, where we observe a growing demand for free-viewpoint replay for scene analysis. However, for these and most other non-studio applications, IBR should ideally work based on existing infrastructure such as manually operated TV cameras. This poses the fundamental question how we can robustly generate a sufficiently accurate geometric proxy, despite the wide-baseline cameras, uncontrolled acquisition conditions, low texture quality and resolution, and inaccurate camera calibration. These problems become even more severe for processing video sequences instead of still images. Under these challenging real-world conditions, classical 3D reconstruction techniques such as visual hulls [MBR*00] or multi-view stereo [Mid09] are generally inapplicable. Due to the involved difficulties, one of the currently most popular approaches in this field is still the use of simple planar billboards [HS06], despite the unavoidable visual artifacts such as ghosting.

A variety of different 3D representations and rendering methods exists that use images or videos as a source. Most of them are tightly connected to particular acquisition setups:

If many cameras with different viewpoints are available, the light field [LH96] of the scene can be computed, which represents the radiance as a function of space. Buehler et al. [BBM*01] generalize this approach to include geometric proxies. The Eye-Vision system used for Super Bowl [Eye09] uses more than 30 controlled cameras for replays of sports events. The method by Reche et al.

[RMD04] for trees requires 20-30 images per object. A recent approach by Mahajan et al. [MHM*09] uses gradient-based view interpolation. In contrast to these methods, our method does not require a dense camera placement.

Many methods additionally use range data or depth estimation in their representation. Shade et al. [SGwHS98] use estimated depth information for rendering with layered depth images. Waschbüsch et al. [WWG07] use colour and depth to compute 3D video billboard clouds, that allow high quality renderings from arbitrary viewpoints. Pekelny and Gotsman [PG08] use a single depth sensor for reconstructing the geometry of an articulated character. Whereas these methods require either depth data or accurate and dense silhouettes, this is not available in uncontrolled scenes with only a few video cameras and weak calibrations.

Several methods for template-based silhouette matching were proposed for controlled studio setups [CTMS03, VBMP08,dAST*08]. For free-viewpoint rendering, the camera images are blended onto the surface of a matched or deformed template model. However, these methods require accurate source images from studio setups whereas articulated billboards can be used with sparsely placed and inaccurately calibrated cameras. In these situations, the geometry of articulated billboards is much more robust against errors than, e.g., a full template body model where the texture has to be projected accurately onto curved and often thin (e.g. an arm) parts. Moreover, the generally required highly tessellated 3D template models are not efficient for rendering the often small subjects with low texture quality and resolution. Debevec et al. [DTM96] proposed a method that uses stereo correspondence with a simple 3D model. However, it applies to architecture and is not straight-forward extendable to articulated figures without straight lines.

Recently, improved methods for visual hulls, the conservative visual hull and the view dependent visual hull, showed promising results [GTH*07,KSHG07]. However, these methods are based on volume carving that requires selected camera positions to remove non-body parts on all sides of the subject. Our method does not require a special camera setting and can already be used with only two source cameras to show, e.g., a bird's eye perspective from a viewpoint above the positions of all cameras. Recent work by Guillemaut et al. [GKH09] addresses many challenges for free-viewpoint video in sports broadcasting by jointly optimizing scene segmentation and multi-view reconstruction. Their approach is leading to a more accurate geometry than the visual hull, but still requires a fairly big number of quite densely placed cameras (6-12). We compare our method to their reconstruction results in Section 7.

A simple method for uncontrolled setups is to blend between billboards [HS06] per subject and camera. However, such standard billboards suffer from ghosting artifacts and do not preserve the 3D body pose of a person due to their planar representation. The idea to subdivide the body into parts represented by billboards is similar in spirit to the billboard clouds representation [DDS03,BCF*05], microfacets [YSK*02,GM03] or subdivision into impostors [ABB*07, ABT99]. However, these methods are not suited for our target application, since they rely on controlled scenes, depth data or even given models. Lee et al. [LBDGG05] proposed a method to extract billboards from optical flow. However, they used generated input images from synthetic models with high quality.

Related to our approach is also the quite large body of work on human pose estimation and body segmentation from images. Here, we can only discuss the most relevant works. Efros et al. [EBMM03] have presented an interesting approach for recognizing human action at a distance with applications to pose estimation. Their method requires an estimate of the optical scene flow which is often difficult to estimate in dynamic and uncontrolled environments. Agarwal and Triggs [AT06], Jaeggli et al. [JKMG07], and Gammeter et al. [GEJ*08] present learning-based methods for 3D human pose estimation and tracking. However, the computed poses are often only approximations, whereas we require accurate estimations of the subject's joint positions. Moreover, we generally have to deal with a much lower image quality and resolution in our setting. We therefore present a semi-automatic, data-driven approach, since a restricted amount of user interaction is acceptable in many application scenarios if it leads to a considerable improvement in quality.

BRIEF SUMMARY OF THE INVENTION

It is therefore an object of the invention to create a method for estimating a pose of an articulated object model of the type mentioned initially, which overcomes the disadvantages mentioned above.

It is a further object of the invention to provide a method for rendering a virtual image as seen from a virtual camera.

It is yet a further object of the invention to provide method for determining a segmentation of a source image segment.

The method for estimating a pose of an articulated object model, wherein the articulated object model is a computer based 3D model of a real world object observed by one or more source cameras, and the articulated object model represents a plurality of joints and of links that link the joints, and wherein the pose of the articulated object model is defined by the spatial location of the joints, comprises the steps of:
  obtaining at least one source image from a video stream comprising a view of the real world object recorded by a source camera (wherein the video stream is live or from a recording);
  processing the at least one source image to extract a corresponding source image segment comprising the view of the real world object separated from the image background;
  maintaining, in a database in computer readable form, a set of reference silhouettes, each reference silhouette being associated with an articulated object model and with a particular reference pose of this articulated object model;
  comparing the at least one source image segment to the reference silhouettes and selecting a predetermined number of reference silhouettes by taking into account, for each reference silhouette,
    a matching error that indicates how closely the reference silhouette matches the source image segment and/or
    a coherence error that indicates how much the reference pose is consistent with the pose of the same real world object as estimated from at least one of preceding and following source images of the video stream;
  retrieving (from the database) the reference poses of the articulated object models associated with the selected of reference silhouettes; and
  computing an estimate of the pose of the articulated object model from the reference poses of the selected reference silhouettes. This pose is the 2D pose of the articulated object model in the source image, so for each of the source images, a separate 2D pose is estimated.

A link linking two joints can be represented by a straight line section between the two joints, that is, the link can be called a linear link, without further subdivisions or intermediate joints. A link can be associated with a link length, possibly constraining or defining a distance between the joints. Depending on the method used to identify the model pose, a link length can be assumed to be constant, constraining adjustment of the joint locations, and/or the link length may be adjusted according to an estimation of joint positions. A link can have an at least partially constrained geometric relationship with an associated projection surface.

The problem of estimating a pose based on few or only one input images is ill-posed because of ambiguities and missing information. In the present invention we make use of a database as a prior to overcome this ill-posed problem.

The step of processing the at least one source image to extract a corresponding source image segment preferably comprises at least the step of segmenting the source image. Image segmentation methods as such are well known and can be adapted for use in the present invention. In a preferred embodiment of the invention, the step of processing comprises a further step such as a motion compensation step. This motion compensation step may be executed before the segmentation step (on the unsegmented image) or after the segmentation step (on the segments of the image). The motion compensation step compensates, in a known manner, for e.g. movement of the source camera and/or the real world object.

The motion compensation at this stage may be used to give an initial estimate of body part or other segments in a particular frame of interest, given a body part or other segmentation of an earlier and/or later frame. The given segmentation of the latter (i.e. earlier or later) frame is moved according to the motion compensation or optical flow between the latter frame and the frame of interest, and used as the initial estimate for the segmentation of the frame of interest.

The source image segments and reference silhouettes both stand for partial images; they are referred to as "segments" and "silhouettes" because they are generated in different contexts. They may be represented conceptually and/or in a computer readable form in a variety of different ways such as, for example
  a blob of pixels; or
  an outline, e.g. in a pixel- or vector based representation, optionally with a fill colour or colour model characterizing the area inside.

In a preferred embodiment of the invention, the matching error and the coherence error are taken into account as a weighted sum of both. The matching error may be based on the image (pixel) information of the reference silhouette and the source image segement, and/or on their respective optical flow. In the latter case, an optical flow is also stored as part of the reference silhouette. This makes it possible to differentiate between images of objects having the same pose but moving in a different manner. The coherence error, too, according to a further preferred embodiment of the invention, takes into account optical flow and/or motion compensation.

For example, given a current image frame and a preceding image, motion compensation parameters that describe the difference between these images (at least in the relevant area of the images) are computed. Then the pose that was estimated in the preceding image frame is moved in accordance with the motion compensation parameters. This is an estimate of the pose in the current frame. Now this estimate of the pose (rather than the pose of the preceding image frame) is compared to the reference pose when determining the coherence error.

In another preferred embodiment of the invention, the estimate of the pose is determined by moving the pose of the preceding image frame in accordance with an optical flow. This optical flow can be that of the preceding image, or of the current image, or of the reference image, or of a combination thereof, such as a (weighted) average.

The above and further examples mostly refer to a preceding image frame. However, the same methods can be applied taking into account more that one image frame, and also following (or later, or future) image frames. Information from all these frames, be it related to motion compensation or optical flow, can be combined by e.g. weighted averaging, in particular by weighing nearby frames more than frames that are further away in time from the current frame.

In a preferred embodiment of the invention, the step of comparing the at least one source image segment to the reference silhouettes comprises the steps of, for each reference silhouette that the source image segment is compared to:
    determining a projective transform that maps the source image segment onto the reference silhouette; and
    computing the matching error as either being proportional to the relative size of the image area in which the mapped source image segment and the reference silhouette do not overlap, or as being a measure of a distance between the outlines of the scaled source image segment and of the reference silhouette, with the matching error optionally also being dependent on parameters of the projective transform;
    and using this matching error as a measure for how closely the source image segment and the reference silhouette match.

The parameters of the projective transform, in principle, comprise information about how far the source image segment and the reference silhouette must be distorted in order to match—as far as such a match can be achieved by the projective transform. For this reason, one or more parameters of the projective transform, or a combination thereof, is preferably incorporated in the computation of the matching error.

In a preferred embodiment of the invention, determining the projective transform is effected by scaling the source image segment to be of the same size as the reference silhouette. The scaling parameters, which need not preserve the aspect ratio of the image segment, correspond to those of a projective transform.

The distance between the outlines of the scaled source image segment and of the reference silhouette can be computed by a line-based metric, such as the Hausdorff distance.

In a preferred embodiment of the invention,
    the abovementioned step of scaling is accomplished by re-sampling either the source image segment or the reference silhouettes or both to have bounding boxes of the same pixel size, and
    both the source image segment and the reference silhouette are represented by binary images having the same pixel dimension, and computing the error value by counting the number of corresponding pixels from the source image segment and the reference silhouette that differ in value.

In a preferred embodiment of the invention, the step of comparing the at least one source image segment to the reference silhouettes comprises the steps of, for each reference silhouette that the source image segment is compared to:
    retrieving the pose of the same real world object estimated from a preceding source image of the video stream;
    computing the coherence error as being proportional to the difference between this preceding pose estimate and the reference pose of the reference silhouette, and using this coherence error as a measure of consistency with the preceding source image.

In a preferred embodiment of the invention, the step of computing an estimate of the pose of the articulated object model from the reference poses of the selected reference silhouettes comprises:
    repeating the preceding steps for one or more further source images from one or more further video streams from further source cameras, each further source image comprising a view of the same real world object having been recorded at the same time but from a different viewpoint, thereby obtaining for each further source image a predetermined number of selected reference silhouettes and associated selected reference poses;
    performing an optimization to select for each source image a most plausible reference pose, by computing for each combination of selected reference poses for the different source images a total joint consistency measure by,
        projecting the joints of the selected reference poses of this combination into 3D space, estimating a 3D position of the joints and computing, for each joint, a joint consistency measure that expresses how well the estimated 3D joint position matches the projection of the joint from the selected reference poses;
        combining the joint consistency measures of all joints to obtain the total joint consistency measure;
    selecting the combination of reference poses for the different source images that optimizes the total joint consistency measure, thereby determining an optimal reference pose for each source image.

In addition to determining an optimal reference pose for each source image, the above procedure also provides an estimate of the 3D position of each joint.

In a preferred embodiment of the invention, the step of performing an optimization further comprises the step of varying and optimizing a 2D offset of each silhouette in the plane of its associated source image in order to correct for source camera calibration errors.

In a preferred embodiment of the invention, the further step of displaying, on a display device, at least one source image with estimated joint positions superimposed over the source image and accepting a user input for interactively modifying one or more joint positions.

In general, the articulated object models associated with the reference poses have the same link topology as the articulated object model of the real world object. Each joint of one of these articulated object models uniquely matches a joint of the other articulated object models.

According to another aspect of the invention, a method for estimating a pose of an articulated object model is provided, wherein, in order to determine a 3D pose matching a given 2D pose associated with a source image, the following steps are performed:
    computing, from the given 2D pose an approximate 3D pose comprising approximate joint positions which approximately match the positions of the corresponding joints of the 2D pose when projected into the image plane of the source image associated with the 2D pose;
    modifying the approximate 3D pose to exactly match the 2D pose by, for each joint, moving the position of the joint from the approximate joint position to a position defined by the intersection of a ray passing from the camera through the joint position in the source image with a plane parallel to the image plane of the source image and passing through the approximate joint position.

These two steps may be performed alone, in order to improve a given 2D pose via an estimated 3D pose, wherein the given 2D pose is determined by an arbitrary preceding estimation method, or in combination with the preferred embodiments of the invention described previously.

According to another aspect of the invention, a method for estimating a pose of an articulated object model is provided, wherein the articulated object model is a computer based 3D model of a real world object observed by two or more source cameras, and the articulated object model represents a plurality of joints and of links that link the joints, and wherein the pose of the articulated object model is defined by the spatial location of the joints, called 3D joint positions, the method comprising the steps of:
    determining an initial estimate of the 3D pose, that is, the 3D joint positions of the articulated object model;

associating each link with one or more projection surfaces, wherein the projection surfaces are surfaces defined in the 3D model, and the position and orientation of each projection surface is determined by the position and orientation of the associated link;

iteratively adapting the 3D joint positions by, for each joint, computing a position score assigned to its 3D joint position, the position score being a measure of the degree to which image segments from the different source cameras, when projected onto the projection surfaces of links adjacent to the joint, are consistent which each other;

varying the 3D joint position of the joint until an optimal position score is achieved;

repeating the step of iteratively adapting the 3D joint positions for all joints for a predetermined number of times or until the position scores converge.

When repeating the iterative adaptation for all joints, the positions converge after a few passes through all joints. The position scores having converged is established, for example, when the improvement of the position scores falls below a predetermined limit.

In a preferred embodiment of the invention, the initial estimate of the 3D pose is determined according to one or more of the preceding aspects of the invention, for example, when determining an optimal reference pose for each source image by the 2D pose estimation, or after improving by template fitting to an estimated 3D pose.

In a preferred embodiment of the invention, the step of varying the 3D joint position of the joints is accomplished by varying the 3D joint positions subject to anthropometric constraints, the anthropometric constraints being at least one of:
the joint is on or above the ground;
lengths of topologically symmetric links do not differ more than %;
the lengths of links are within anthropometric standards;
distances between joints not connected by a link are within anthropometric standards.

In a preferred embodiment of the invention, the projection surfaces, for each link, comprise a fan of billboards, each billboard being associated with a source camera, and each billboard being a planar surface spanned by its associated link and a vector that is normal to both this link and to a line connecting a point of the link to the source camera. In other words, each billboard is a projection surface and is associated with a link and with a source camera.

In a preferred embodiment of the invention, the position score of a 3D joint position of a joint is computed by the steps of, for each link adjacent to the joint,
projecting the images from the different source cameras onto the associated projection surfaces of the link and from there into a virtual image as seen by a virtual camera;
for an area (or for all pixels) in the virtual image that correspond to the projection of these projection surfaces into the virtual image, computing a partial position score for this link according to the degree to which the image segments from the different source cameras overlap and have a similar colour;
combining (for example, by adding) the partial position scores to obtain the position score.

In other words, the consistency of the projections of the image segments from the different source cameras is evaluated in a view corresponding to that of the virtual camera. Since the optimisation is based on target functions that are defined in the virtual image, no ultimately unnecessary parameters are determined, and overall efficiency is high.

In a preferred embodiment of the invention, computing and combining the partial position score comprises the steps of:
computing the partial position score for each pair of source cameras contributing to the virtual image;
combining these partial position scores by adding them, weighing each partial position score according to the angle between the viewing directions of the associated pair of source cameras.

According to another aspect of the invention, a method for rendering a virtual image as seen from a virtual camera is provided, given an articulated object model, wherein the articulated object model is a computer based 3D model of a real world object observed by two or more source cameras, and the articulated object model represents a plurality of joints and of links that link the joints, and wherein the pose of the articulated object model is defined by the spatial location of the joints, the method comprising the steps of:
determining an estimate of the 3D pose, that is, the 3D joint positions of the articulated object model;
associating each link with one or more projection surfaces, wherein the projection surfaces are surfaces defined in the 3D model, and the position and orientation of each projection surface is determined by the position and orientation of the associated link;
wherein the projection surfaces, for each link, comprise a fan of billboards, each billboard being associated with a source camera, and each billboard being a planar surface spanned by its associated link and a vector that is normal to both this link and to a line connecting a point of the link to the source camera;
for each source camera, projecting segments of the associated source image onto the associated billboard, creating billboard images;
for each link, projecting the billboard images into the virtual image and blending the billboard images to form a corresponding part of the virtual image.

The billboard images are blended, that is, multiple billboards for one link do not occlude one another). Occlusion may however occur between separate links, i.e. separate body parts.

According to another aspect of the invention, a method for determining a segmentation of a source image segment is provided, the method comprising the steps of:
obtaining at least one source image from a video stream comprising a view of a real world object recorded by a source camera;
processing the at least one source image to extract a corresponding source image segment comprising the view of the real world object separated from the image background;
maintaining, in a database in computer readable form, a set of reference silhouettes, each reference silhouette being associated with a reference segmentation, the reference segmentation defining sub-segments of the reference silhouette, each sub-segment being assigned a unique label;
determining a matching reference silhouette which most closely resembles the source image segment and retrieving the reference segmentation of the reference silhouette;
for each sub-segment, overlaying both a thickened and a thinned version of the sub-segment over the source image segment and labelling the source image pixels which lie within both the thickened and the thinned version with the label of the sub-segment;
labelling all remaining pixels of the source image segment as unconfident;

for each sub-segment, determining a colour model that is representative of the colour of the pixels labelled with the sub-segment's label;

labelling the unconfident pixels according to the colour model, by assigning each unconfident pixel to a sub-segment whose colour model most closely fits the colour of the unconfident pixel.

The above steps for segmentation of a source image segment may be performed alone, in order to improve a given 2D pose via an estimated 3D pose, wherein the 2D pose is determined by an arbitrary preceding estimation method, or in combination with the preferred embodiments of the invention described previously.

A colour model is a probabilistic model for the colour distribution of pixels. Having such a model for each body part allows to compute probabilities for a new pixel to estimate to which body part it belongs to. For example, a colour model may be a Gaussian Mixture Model.

In a preferred embodiment of the invention, the assigning of unconfident pixels does not take into account whether the sub-segment that a pixel is assigned to lies close to the pixel. This allows to assigns pixels correctly even if no confident pixels of the sub-segment are visible at all.

In an alternative embodiment, the assigning takes into account the location of an unconfident pixel, and in case the colour of the pixel matches the colour model of more than one sub-segment, assigns it to the sub-segment that lies closest to the pixel.

A general observation with regard to the present invention is that the 3D pose and shape of a character can be well captured by articulated billboards, that is, by an articulated subdivision of the body into simple geometric primitives. Instead of relying on accurate silhouette information for computing the visual hull or stereo correspondences, our representation requires an estimate of the 2D pose of a subject in the input views. This can be achieved in a simple and very efficient manner by a semi-automatic, data-driven algorithm. From the pose it is then possible to construct a 3D articulated billboard model, which is a faithful representation of the subjects geometry and which allows for photorealistic free-viewpoint video. Different aspects of the invention are:

Articulated billboards, a novel shape representation for free-viewpoint video of human characters under challenging acquisition conditions.

Semi-automatic, data-driven 2D pose estimation based on approximate silhouettes.

Automatic segmentation of body parts by 3D template fitting and learning of colour models.

Generation of the articulated billboard model by 3D pose optimization and seam correction for optimal texture consistency.

GPU-based, pixel-accurate blending and rendering for realistic and efficient view synthesis.

Applications for articulated billboards are multi-view videos of dynamic scenes with humans captured in uncontrolled environments. Even from as few as two conventional TV camera images, a scene can be rendered at a high quality from virtual viewpoints where no source camera was recording.

Combining the different method aspects described above, the following workflow may be implemented: The basic idea is to approximate the articulated 3D shape of the human body using a subdivision into textured billboards along the skeleton structure. Billboards are clustered to fans such that each skeleton bone contains one billboard per source camera. First, for each input view, a 2D pose estimation based on image silhouettes, motion capture data, and temporal video coherence is used to create a segmentation mask for each body part. Then, from the 2D poses and the segmentation, the actual articulated billboard model is constructed by a 3D joint optimization and compensation for camera calibration errors. The subsequently applied rendering method blends the textural contributions of each billboard and preferably features an adaptive seam correction to eliminate visible discontinuities between adjacent billboards textures. The use of articulated billboards does not only minimize ghosting artifacts known from conventional billboard rendering, but also alleviates restrictions to the setup and sensitivities to errors of more complex 3D representations and multi-view reconstruction techniques. The results demonstrate the flexibility and the robustness of the approach with high quality free-viewpoint video generated from broadcast footage of challenging, uncontrolled environments.

General remark regarding terminology: the term "A is associated with B" means that there is a assignment, or, in other words, a relationship between A and B. The relationship may be a one to one, one to many, or many to many relationship.

A computer program product for estimating a pose of an articulated object model according to the invention is loadable into an internal memory of a digital computer or a computer system comprising a computer memory and a processing unit coupled to the computer memory, and comprises computer program code means, that is, computer-readable instructions, to make, when said computer program code means is loaded in the computer, the computer execute the method according to the invention. In a preferred embodiment of the invention, the computer program product comprises a computer readable storage medium, having the computer program code means recorded thereon.

Further preferred embodiments are evident from the dependent patent claims.

BRIEF DESCRIPTION OF THE DRAWINGS

The subject matter of the invention will be explained in more detail in the following text with reference to preferred exemplary embodiments which are illustrated in the attached drawings, in which:

FIG. 3a typical silhouette in a segmented image;

FIG. 3b three best matching poses from a database;

FIG. 3c 2D skeleton pose estimated from best matching pose;

FIG. 4 3D joint estimation from two camera images;

FIG. 5a an image with (manually) corrected joint positions;

FIG. 5b initial fitting of a pre-segmented 3D shape template to an image;

FIG. 5c corrected fit which exactly matches the joint positions in 5a;

FIG. 6a initial segmentation of an image of a body, with safe pixels derived from a template model, and with unconfident boundary pixels;

FIG. 6b segmentation after labelling according to a trained colour model;

FIG. 6c final segmentation after morphological removal of outliers;

FIG. 7a misaligned billboards in a billboard fan;

FIG. 7b a billboard fan before joint optimization;

FIG. 7c the same billboard fan after joint optimization;

FIG. 8a sampling errors causing cracks between billboards;

FIG. 8b a corresponding rendering artifact;
FIG. 8c correction of the rendering artifact.

The reference symbols used in the drawings, and their meanings, are listed in summary form in the list of reference symbols. In principle, identical parts are provided with the same reference symbols in the figures.

DETAILED DESCRIPTION OF PREFERRED EMBODIMENTS

Figure 1:
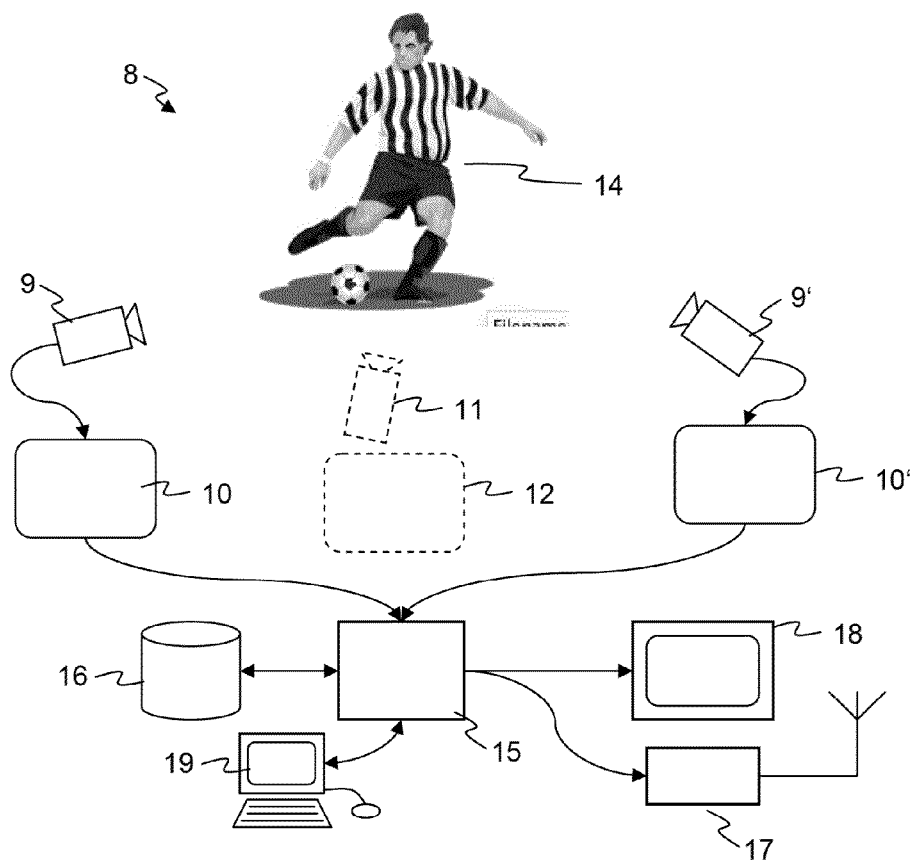
FIG. 1 schematically an overview over a real world scene.

FIG. 1 schematically shows an overview over a real world scene 8, the scene 8 comprising a real world object 14 such as a human, being observed by two or more source cameras 9, 9', each of which generates a video stream of source images 10, 10'. The system and method according to the invention generates a virtual image 12 showing the scene 8 from a viewpoint of a virtual camera 11 which is distinct from the viewpoints of the source cameras 9, 9'. Optionally, from a sequence of virtual images 12 a virtual video stream is generated. An apparatus according to the invention comprises a processing unit 15 which performs the image processing computations implementing the inventive method, given the source images 10, 10' and generating one or more virtual images 12. The processing unit 15 is configured to interact with a storage unit 16 for storing source images 10, virtual images 12 and intermediate results. The processing unit 15 is controlled by means of a workstation 19 typically comprising a display device, a data entry device such as a keyboard and a pointing device such as a mouse. The processing unit 15 may be configured to supply a virtual video stream to a TV broadcasting transmitter 17 and/or to video display devices 18.

Figure 2:
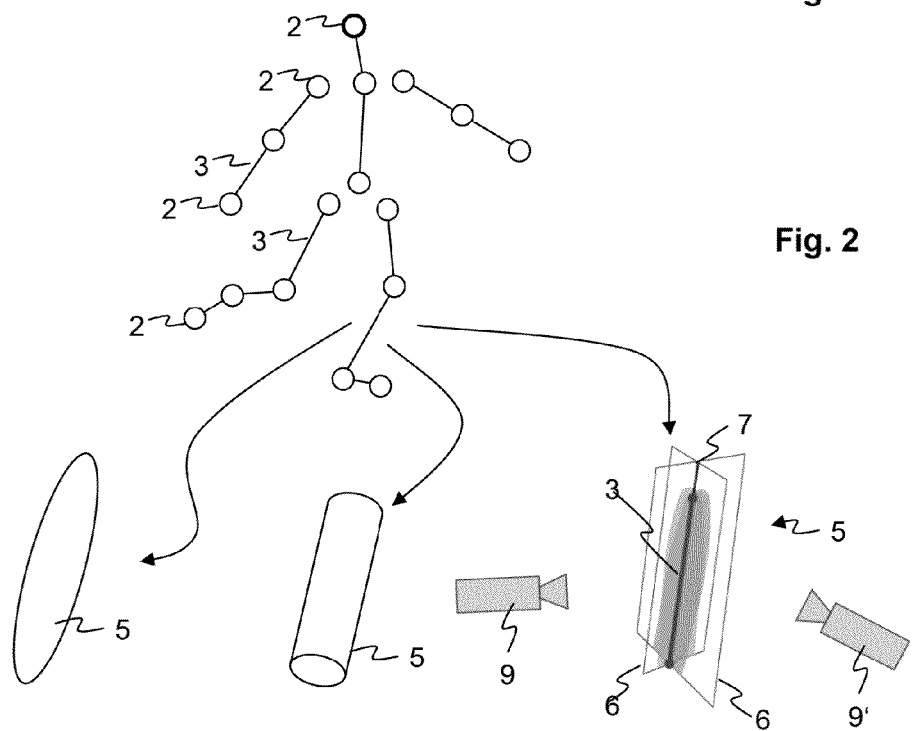
FIG. 2 an articulated object model with associated projection surfaces.

FIG. 2 schematically shows a 3D model 1 of the scene 8, comprising an articulated object model 4 of the real world object 14. The 3D model 1 typically further comprises other object models, e.g. representing other humans, the ground, buildings etc (not shown). The articulated object model 4 comprises joints 2 that are connected by links 3, roughly corresponding to bones or limbs in the case of the model of a human. Each joint 2 is defined as a point in 3D-space, and each link 3 can be represented by a straight line connecting two joints 2 through 3D-space. Furthermore, a variety of projection surfaces 5 that may be associated with the links 3 of the articulated object model 4 are shown. This association comprises an at least partly fixed geometric relationship between the projection surfaces 5 and the link, consequently, the projection surfaces 5 move with the link. According to different embodiments of the invention, the projection surfaces 5 are (from left to right)

ellipsoidal bodies;
cylindrical bodies; or
a set of billboards 6 forming a billboard fan 7.

The association between a link and a projection surface can be, for example, that the link (i.e. a straight line joining the two joints connected by the link) defines a major axis of such an ellipsoidal body or cylinder, or lies within the plane of one or more such billboards. Billboards 6 per se, for projecting virtual views, are known in the art. In the present invention, two or more planar billboards 6 are associated with a single link 3 of the articulated object model 4. Each billboard 6 is associated with one source camera 9. The plane of the billboard 6 comprises the link 3, with the orientation of the billboard 6 around the link 3 being defined by the location of the associated source camera 9. Preferably, the billboard 6 is normal to the shortest line between the source camera 9 and the direction of the link 3. All the billboards 6 for one link 3 form together a billboard fan 7. The images of the source cameras 9 are projected onto the associated billboards 6 of each link 3, and then projected into virtual camera 11, and blended together, from the billboards 6 of the link 3, to form the virtual image 12 of the link 3. Thus, the billboards 6 of the link 3 do not occlude one another. However, they may occlude the billboards 6 of another link 3.

Overview

One aim of the present invention is to enable virtually unconstrained free-viewpoint rendering of human subjects from a small set of wide-baseline video footage. We use a representation based on articulated billboards 6. The basis of this model is a 3D human skeleton structure 4 (see FIG. 2). Every bone or link 3, represented by a 3D vector $b_i$ and the position of its end-joint 2 $x_i$, corresponds to a major component of the real world body 14, e.g., the torso or the extremities. With each bone we associate a fan 7 of billboards 6, which contains a billboard 6 for every input image $l_i$ of a subject (see FIG. 2). More specifically, for each $l_i$ the corresponding billboard plane is defined by the joint $x_i$, the bone direction $b_i$ and the vector $b_i \times (c_j - x_i)$, where $c_j$ is the camera position of $l_i$. Hence, the billboards 6 are aligned with the character bones and as orthogonal as possible to their associated input views 10, 10'.

The basic idea of our method is to compute a 3D pose of the articulated billboard model, i.e., a spatial joint configuration of the underlying skeleton structure 4, which brings its 2D projection into correspondence with the subject's pose in each input frame of the video. After this alignment, a texture map and alpha mask is generated for each billboard 6 from its associated view 10, 10'. However, a fully automatic computation of a single 3D pose, which is perfectly consistent with all input views, may not be possible in the presence of issues such as imperfect camera calibration or low texture resolution. In such cases, a semi-automatic, data-driven approach is applied, which operates in three consecutive phases: a 2D pose estimation and template-based image segmentation, the construction of the articulated 3D billboard model, and the actual rendering.

First, for the 2D pose estimation in each individual input view, we utilize a database of silhouettes, temporal motion coherence of subjects in the video, and motion capture data to assist the user in fast and accurate placement of joints 2. Given these 2D joint positions, a segmentation of the image into the different body parts, i.e., the torso or the limbs, is computed using a human template model in order to map image-pixels to billboards (see Section 2 "Pose Estimation and Template-based Segmentation").

The second phase of the algorithm integrates the pose and texture information from all individual views and generates the final articulated billboard model for rendering. This processing step includes an optimization of the 3D joint positions and a compensation for camera calibration errors, which optimizes the texture overlap for each model segment, i.e., for each fan 7 of billboards 6. A final alpha-mask and texture optimization eliminates visible seams and discontinuities between adjacent billboards (see Section 3 "Construction of the Articulated 3D Billboard Model").

The last step is the actual real-time rendering of novel views. Section 4 describes an algorithm for a fully GPU-based, view-dependent per-pixel blending scheme, which is optimized for rendering articulated billboard models efficiently while preserving the photorealism of the original input video.

2. Pose Estimation and Template-Based Segmentation

In the first phase of the method we compute an initial guess of the subject's 14 joint positions in image space and a segmentation of the pixels into the different body parts. For calibration of the intrinsic and extrinsic camera parameters we currently use the method of Thomas [Tho06]. As mentioned previously a fully automatic pose estimation and segmentation is very challenging due to the relatively low resolution and quality. Accordingly, we propose the following semi-automatic approach which minimizes the required user-interaction to only a few mouse-clicks. Then, given the joint 2 positions, the segmentation of the subject's 14 body parts is computed by fitting a human template model with a known segmentation to the input video frames.

2.1. 2D Pose Estimation

We assume that a coarse segmentation of the subject 14 from the background is available, e.g., using chroma keying or background substraction. FIG. 3*a* shows a typical example of a segmented image 13 in our application scenario. The basic idea to compute an initial guess of a subject's pose, i.e., the 2D positions of the skeleton joints 2, is to compare it to a database of silhouettes, for which the respective skeleton poses are known (see FIG. 3*b*). First, for each view h, we normalize for differently sized subjects by re-sampling the silhouette 13 on a 32×40 grid and stack the binary silhouette information at each grid point into a vector $y_j \in [0,1]^n$, with n=32×40. Then, for each $v_j$, our algorithm finds the best matching k entries in the database, which minimize the error $$E_S = (1-\lambda)\frac{1}{n}\sum_{i=0}^{n-1}|v_j(i) - w(i)| + \lambda\frac{1}{m}\sum_{r=0}^{m-1}|p_j(r) - q(r)|, \quad (1)$$

where w is an entry in the database, q its corresponding 2D joint positions, and m is the number of skeleton joints. The vector $p_i$ contains the joint coordinates from the previous video frame. The first term of Eq. (1) ensures a proper match of the silhouettes whereas the second term exploits temporal motion coherence of subject's in the video. In other words, minimization of (1) returns the database entry that looks most like the current image and whose joint 2 positions are closest to the joint positions from the preceding image. This is of particular help to resolve left-right ambiguities in the silhouettes. The influence of the second term can be weighted by the value λ. For the first frame of a sequence we simply set λ=0, for all other frames we used a value of λ=0.5 for all our examples. The joint 2 positions are also processed in normalized coordinates with respect to the subject's bounding box. Using this error $E_s$, the k=3 best matching silhouettes and their corresponding 2D joint positions for each single view $l_i$ are retrieved from the database.

In order to select the most plausible 2D pose from each of these sets we run a multi-view optimization for each combination of poses: we compute the 3D rays from each camera $c_j$ center through the retrieved joint positions in $l_i$. Then, we compute the 3D representative for each joint 2 which is closest to the corresponding rays. FIG. 4 shows an example with two cameras 9, 9'.

The measure for the quality of a particular combination of poses is the accumulated sum of distances of each 3D joint from its respective rays. In order to make this procedure more robust to the often inaccurate camera calibration, this multi-view optimization also includes a simple correction step. For each silhouette, a 2D offset in the image plane is introduced as an additional parameter. When minimising the accumulated sum of distances, these 2D offsets are varied as well, using the Levenberg-Marquardt algorithm. This calibration correction proved to be very effective: for some silhouette images the necessary 2D offset for minimizing the error measure can be as high as 8 pixels.

In summary, the abovementioned optimisation is performed for each combination of the best matching silhouettes for each view. For example, given two cameras, and having found for each camera (or view) three best matching silhouettes, then the multi-view optimization is performed nine times. For each camera, the 2D pose is chosen which gives the smallest accumulated sum of distances over all the optimimization runs.

As demonstrated in FIG. 3*c*, this silhouette-based pose estimation and joint optimization generally provides a good guess of the subject's 2D joint positions in each view 4. With a simple interface the user can then manually correct these positions by moving the joints (see FIG. 5*a*). After this manual joint refinement step the silhouette and joint positions are preferably immediately added to the database. The increase of poses in the database has proven to lead to significantly better matches for new sequences. In application scenarios where no silhouette information is available at all, the user can resort to placing all joints manually.

2.2. 3D Template Fitting

Even with accurate 2D joints a robust segmentation of the image into the subject's body parts is still a difficult problem. Using a database of segmented silhouettes instead of the above binary silhouette segmentation is not a desirable option, since creating such a database would be extremely complex and time-consuming, and we could still not expect to always find sufficiently accurate matches.

Instead, we fit a generic, pre-segmented 3D template model to the images. This has the considerable advantage that we get a good starting solution for the segmentation process and that we can easily resolve occlusions. However, fitting a 3D model requires, for each particular input view, the computation of a 3D pose whose projection perfectly aligns with the 2D joints. A 3D pose leading to a perfect match in all views can often not be found due to calibration inaccuracies or slight joint misplacements. Therefore, we fit a 3D model per input view. A solution for computing an approximate 3D pose for articulated models from a single image has been presented by Hornung et al. [HDK07]. Given the 2D joint positions $x_i$ for an image $l_j$, their approach uses a database of 3D motion capture data to find a set of 3D joint positions $x_i$ whose projection approximately matches the 2D input joints (see FIG. 5*b*). We provide a simple but effective modification to their algorithm for computing the required accurate fit.

This is done as follows: The approximate 3D match is deformed, such as to align with the 2D joints, according to the following algorithm: Through each 3D joint $X_i$, we create a plane parallel to the image plane of $l_j$. Then, we cast a ray from the camera center $c_j$ through the corresponding target joint position $x_i$ in $l_j$ and compute its intersection with the plane. The 3D pose is then updated by moving each $X_i$ to the respective intersection point and updating the 3D bone coordinate systems accordingly. In other words: this procedure assumes that the distance from the camera to the joint is correct, and adjusts the 3D position of the joint to match the image while keeping the distance from the camera constant. The result is the required 3D pose which projects exactly onto the previously estimated 2D joints. The 3D template model can now be fitted to the image by deforming it according to this computed 3D pose using standard techniques for skeleton-based animation [LCF00] (see FIG. 5*c*). Please note that this algorithm generally does not preserve the limb lengths of the original 3D skeleton and therefore, enables an adaptation of the 3D template mesh to fit the subject's dimensions more accurately.

2.3. Segmentation of Body Parts

The fitted, pre-segmented template model does not perfectly segment the input frame $I_j$ and might not completely cover the entire silhouette. Therefore, a refinement of the segmentation is done in three simple steps. In a first step, a colour model is learned per body segment based on automatically selected confident pixels of the pre-segmented body parts (see FIG. 6a). In a second step, the trained colour model is used to label the unconfident pixels leading to a segmentation adjusted to the subjects body dimensions and silhouette (see FIG. 6b). In a third step, a morphological closing operation removes outliers as depicted in FIG. 6c.

To determine the confident pixels, we project a slightly thinned and thickened version of the template model into the image and label the silhouette pixels accordingly. Pixels which receive the same label in both projections are marked as confident pixels and labeled with the corresponding body segment. All remaining pixels within the silhouette are labeled as unconfident as shown in FIG. 6a.

By learning the colour model online, we provide a robust segmentation algorithm being able to handle segmentation in uncontrolled environments. Changing lighting conditions, subject specific appearance or view dependent appearance can thus be handled reliably.

The pose estimation and segmentation procedure is performed for every view and input frame from which free-viewpoint renderings are to be generated. As a result, the segmentation approach using successive 2D pose estimation and 3D template fitting automatically handles occluded body parts, is robust even for low image quality and resolution, and requires only a small amount of simple user interaction during the refinement of joint positions.

3. Construction of the Articulated 3D Billboard Model

We use the computed 3D joint positions of Section 2.1 as an initial pose for the final articulated billboard representation. If a 3D joint of the articulated billboard model is not optimally positioned, the texture resulting from the rendering of all billboards of a billboard fan will not align (see FIG. 7a). In this section, we describe how the 3D joint positions can be optimized based on a quantitative measure of the alignment of the billboard textures.

In the following, we first define a scoring function for a position of a joint in one view and for one camera pair. This scoring function is then extended to several views and cameras. Using this scoring function and anthropometric constraints the 3D pose of the articulated billboard model is optimized. Finally, we will describe a seam correction which removes texture discontinuities between adjacent billboards.

3.1. Position Scoring

To score the quality of a joint position of an output view V, all billboards adjacent to this joint are evaluated. For each fan of billboards, the alignment of its billboards for a pair of input views $(l_1, l_2)$ is scored by a pixel-wise comparison of the projected textures. For every output pixel p of V, the per-pixel score $s_{l2,l2}(p)$ is defined as $$s_{l_1,l_2}(p) = \begin{cases} 1 - \varepsilon(V_{l_1}(p), V_{l_2}(p)), & p \text{ active in } l_1 \text{ and } l_2 \\ 0, & \text{otherwise} \end{cases} \quad (2)$$

Where $V_{l_j}(p)$ is the colour contribution of a billboard associated with view $l_j$ to pixel p. $\varepsilon(\cdot)$ is a colour distance measure in RGB. The active pixels are defined as those pixels in the output view V which receive a valid colour contribution from the input views $l_1$ and $l_2$. The segmentation generated in Section 2.3 is used to reliably resolve occlusion. The score for a joint in a view V is the normalized sum of all pixels $$s_{l_1,l_2}(V) = \frac{\sum_{p \in V} s_{l_1,l_2}(p) n(p)}{\sum_{p \in P_V} n(p)}. \quad (3)$$

The normalization factor n(p) is 1, if at least one of the two pixels is active and 0, otherwise. Thus, the scoring function measures the matching of texture values, while n(p) penalizes non-aligned parts as in FIG. 7a. These pixel-wise operations are efficiently implemented on the GPU using fragment shaders. In summary, the procedure according to (1) and (2) determines to which degree the image contributions from the different cameras match, as seen from the virtual viewpoint and in the virtual output image, and only for those pixels for which the output image receives a contribution from both source cameras.

For more than two input views, we define the score as a weighted average of all camera pairs, where the weight for each camera pair depends on the angle $\beta_{l1,l2}$ between the respective viewing directions, with narrow angles receiving a higher weight:

$$s(V) = \frac{\sum_{(l_1,l_2) \in \mathcal{I}} s_{l_1,l_2}(V) \omega(\beta_{l_1,l_2})}{\sum_{(l_1,l_2) \in \mathcal{I}} \omega(\beta_{l_1,l_2})}, \quad (4)$$

where $\mathcal{I}$ is the set of all pairs of input views and $\omega(\beta)$ is, for example, a Gaussian weight:

$$\omega(\beta) = e^{-\frac{\beta^2}{2\sigma^2}}. \quad (5)$$

The value for 6 was empirically determined to be 0.32. Finally, the score of the joint position is the normalized sum of the scores in all evaluated views:

$$s_v = \frac{1}{|v|} \sum_{v \in V} s(V), \quad (6)$$

where $\upsilon$ is the set of all evaluated views.

3.2. 3D Pose Optimization

Since the scoring of the joint position depends on the evaluated views, we need a suitable set $\upsilon$. In order to cover a reasonable range of viewing positions, we evaluate the scoring function at the camera positions of all input views and the virtual views in the center between each camera pair. For the position optimization of a joint, we evaluate Sυ at spatially close candidate positions on a discrete, adaptive 3D grid. The grid is refined in a greedy manner around those candidate positions which achieve a higher score Sυ, until a given grid resolution is reached (empirically set to 1.2 cm).

To avoid degenerate configurations with billboard fans of zero length, we additionally consider the anthropometric consistency [NAS09] during the evaluation of each pose. A joint position receives a zero score if one of the following constraints does not hold:

The joint is on or above the ground.
Lengths of topologically symmetric skeleton bones (e.g., left/right arm) do not differ more than 10%.
The lengths of adjacent bones are within anthropometric standards.
Distances to unconnected joints are within anthropometric standards.

For the last two constraints, we use the 5th percentile of female subjects rounded down as minimal lengths and the 95th percentile of male subjects rounded up as maximal lengths.

This grid-search optimization process is iteratively repeated over the skeleton. That is, in each iteration the position is optimized separately, as described, for each joint of the set of all joints. In our experiments, we found that it typically converges after 4 iterations. Since the optimisation is based on target functions that are defined in the virtual image, no ultimately unnecessary parameters are determined, and overall efficiency is high. See FIG. 7 for an articulated billboard model before (7b) and after (7c) optimization.

3.3. Texture Seam Correction

Due to sampling of the billboards' segmentation masks during rendering with projective texturing (see FIG. 8a), small discontinuities (visible cracks) between adjacent billboards may appear in the output view as shown in FIG. 8b: In the virtual image 12, an output pixel from a first billboard 6 may fall, when projected into the segmented source image 10, within a second segment 13b that is assigned to an adjacent second billboard 6', rather than into a first segment 13a assigned to the first billboard 6. Consequently, the output pixel receives no colour contribution at all. To overcome this problem, these seam pixels have to be rendered for both adjacent billboards. Therefore, we mark pixels as seam pixels in the input views if they cover billboards on two adjacent skeleton bones or links 3 (e.g., pixel enclosed by dashed lines in FIG. 8a).

To detect seam pixels, the segmentation mask is traversed for each input view. A pixel p is marked as seam pixel, if it fulfills both of the following conditions:
At least one pixel p' in its 4-neighborhood has a different label but comes from the same subject
|depth(p)−depth(p')|<φ
where depth(•) is the depth value at this pixel. The threshold φ distinguishes between occluding parts and connected parts. It was empirically set to φ=3 cm. An example for the seam corrected segmentation mask and the resulting rendering improvement is shown in FIG. 8c.

4. Rendering

In the following we describe a rendering procedure for articulated billboards. We designed this algorithm according to the general criteria defined by Buehler et al. [BBM*01]. Due to our challenging setting with calibration errors and very sparse camera positioning, our particular focus is on:
Coherent Appearance: Adjacent billboards should intersect without cracks or disturbing artifacts and blend realistically with the environment.
Visual Continuity: Billboards should not suddenly change or pop up when moving the viewpoint.
View Interpolation: When viewing the scene from an original camera angle and position, the rendered view should reproduce that of the input camera.

Input to the rendering procedure are the articulated billboard model, the segmented input views $\mathcal{I}$ (Section 2.3) and the seams computed in Section 3.3. For each rendered output frame, the articulated billboards are sorted back-to-front for a proper handling of occlusions. In order to meet the above goals, we perform a per-pixel blending procedure. We separate between per-camera weights which are computed once per billboard and the final per-pixel weights.

4.1. Camera Blending Weights

For a smooth blending of the billboards 6 associated with one fan 7 of billboards 6, we use the same Gaussian weight as in Eq. (5). To achieve an interpolation at an original camera view 10, we introduce an attenuation function which ensures that all views from an original camera 9 perspective are identical to the corresponding camera source images 10 while still assuming a smooth transition between different views. The attenuation function is defined as $f(I\omega_{Max})=1$ for the source view $I\omega_{Max}$ with the highest value of $\omega(\bullet)$ (that is, the closest source camera 9) and $$f(I_{\omega_{Max}}) = 1 - e^{-\frac{d(V,I_{\omega_{Max}})^2}{2\sigma^2}} \quad (7)$$

for all other cameras $l_j$. $d(V,I\omega_{Max})$ is the Euclidean distance from the viewer's virtual camera 11 position to the source camera 9 position of view $I\omega_{Max}$. The constant σ is empirically determined to be 1 meter, which is lower than the minimal distance between two source cameras 9 and thus does not lead to any discontinuities.

4.2. Per-Pixel Processing

The billboards of a billboard fan are blended per-pixel. As shown in FIG. 8a, a camera look-up in the corresponding segmentation mask of each billboard is performed. This determines if the current output pixel p is on the body part belonging to this billboard. If so, then the corresponding colour contribution $V_{I_j}(p)=0$ from source view $l_j$ and its alpha value $\alpha_{I_j}(p)$ can be added to the output view V. Otherwise, we set $\alpha_{I_j}(p)=0$ i.e., transparent. The latter case also occurs when the corresponding body part is occluded in and the colour information should be taken from other cameras. The resulting colour value V(p) of the screen pixel is then $$V(p) = \frac{\sum_{l_j \in I} V_{l_j}(p) w(I_j, p)}{\sum_{l_j \in I} w(I_j, p)} \quad (8)$$

with the set of all input views $\mathcal{I}$ as in Eq. (2) and the per-pixel weights $$w(l_j,p)=\alpha_{I_j}(p)\omega(\beta_{I_j})f(I_{\omega_{Max}}). \quad (9)$$

This is done for all colour channels separately. The resulting alpha value is $$\alpha_V(p) = \begin{cases} \alpha_{I_{\omega_{Max}}}(p), & \text{if } w(I_{\omega_{Max}}, p) \neq 0 \\ \frac{\sum_{l_j \in I} \alpha_{I_j}(p) w(I_j, p)}{\sum_{l_j \in I} \alpha_{I_j}(p)\omega(\beta_{I_j})}, & \text{otherwise} \end{cases} \quad (10)$$

where the first case applies, if the closest camera is used for this pixel. Eq. (8) and Eq. (10) make sure that the colour values are blended such that the factors sum up to 1. However, the alpha values do not have to sum up to 1, e.g., if continuous alpha mattes are available instead of binary segmentation masks.

In addition to this, billboards seen at an oblique angle or from the backside, i.e., having a normal in an angle close to or more than 90 degrees away from the viewing direction, are simply faded out. For simplification, these factors are not shown in the equations.

Figure 9A:
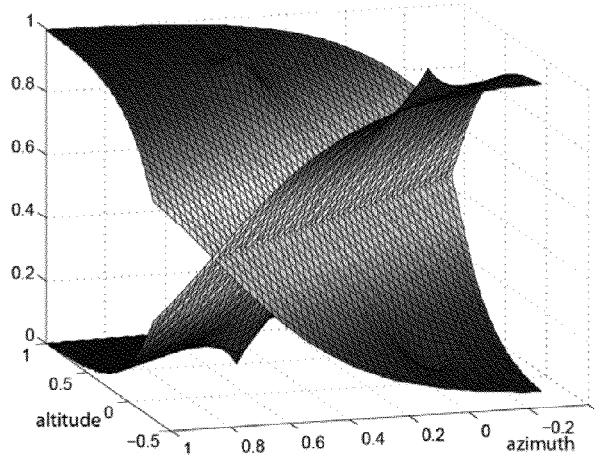
FIG. 9a blending weight example for two source cameras.

An example for blending of intensities (i.e., one colour channel) of two cameras is shown in FIG. 9a where the azimuth and altitude angles are from spherical coordinates of the view position around the fan of billboards. The two peak points at (0.0, 0.0) and (0.5, 0.5) correspond to the positions of the source cameras. As it can be seen in the plot, when approaching these points the corresponding camera's weight increases to 3D model 1.0 and all other camera weights decrease to 0.0. Therefore, in this case only the source camera is used which results in the exact reproduction of the source image.

Figures 9B, 9C, 9D:
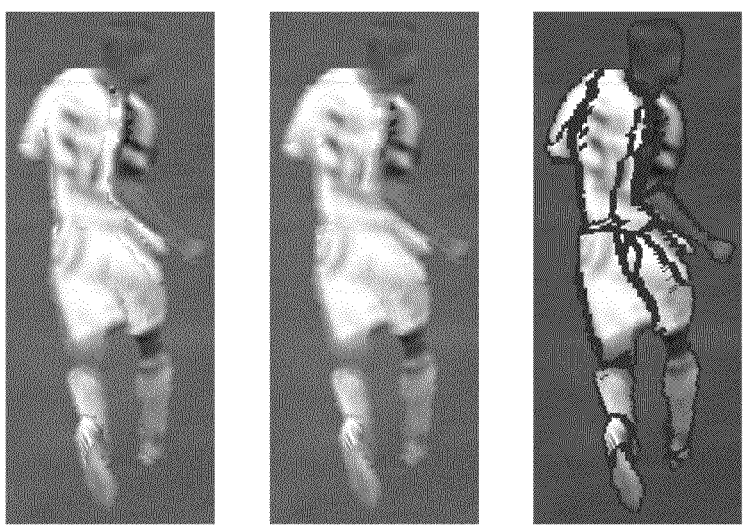
FIG. 9b image rendered without smoothing.
FIG. 9c image rendered with adaptive smoothing.
FIG. 9d discontinuities where smoothing has been applied.

Finally, to prevent non smooth edges at the boundaries of a fan of billboards with respect to the background, other billboard fans, and at locations where other input views receive the highest weight (e.g., due to occlusions on a billboard), an additional Gaussian smoothing step is applied. This is done adaptively as a post-process only at discontinuities detected and stored while rendering the billboards. FIG. 9b, c and d show an example: 9b image without smoothing, 9c with adaptive smoothing, 9d locations where discontinuities have been eliminated through smoothing.

Figure 10:
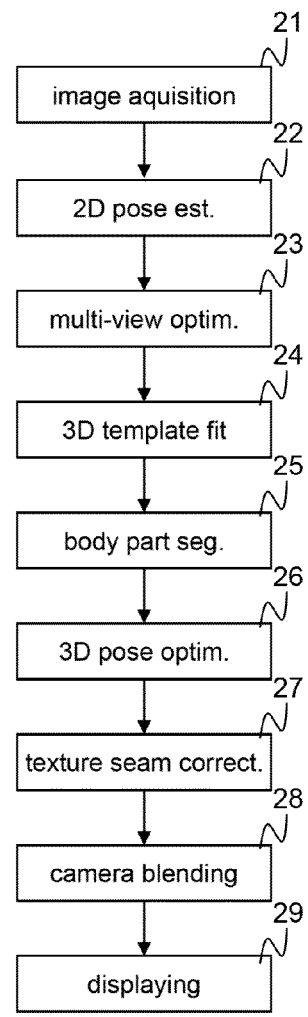
FIG. 10 a flow chart of a method according to the invention.

FIG. 10 shows a flow chart of a method according to the invention. In a first step 21, at least one image per source camera 9 is acquired, either from a live video stream, or from stored images or video streams. In a second step 22 the 2D pose estimation is performed. In an optional third step 23, the multi-view optimisation is performed. In a fourth step 24, the 3D template fitting is performed. In a fifth step 25, the segmentation of body parts is performed. In a sixth step 26, the 3D pose optimization, based on the position scoring, is performed. In a seventh step 27, the texture seam correction is performed. In an eighth step 28, the camera blending of the billboards 6 of each billboard fan 7 is performed. In a ninth step 29, the final image is stored and/or displayed. Whereas the preceding explanation pertains to the representation and rendering of a single articulated object, the final image may comprise a plurality of articulated objects and images of a background and other objects.

While the invention has been described in present preferred embodiments of the invention, it is distinctly understood that the invention is not limited thereto, but may be otherwise variously embodied and practiced within the scope of the claims.

Bibliography

ABB*07
 ANDÚJAR C., BOO J., BRUNET P., FAIRÉN M., NAVAZO I., VÁZQUEZ P., VINACUA À.:
 Omni-directional relief impostors.
 Computer Graphics Forum 26, 3 (2007), 553-560.
ABT99
 AUBEL A., BOULIC R., THALMANN D.:
 Lowering the cost of virtual human rendering with structured animated impostors.
 In WSCG'99 (1999).
AT06
 AGARWAL A., TRIGGS B.:
 Recovering 3d human pose from monocular images.
 IEEE Trans. Pattern Anal. Mach. Intell. 28, 1 (2006), 44-58.
BBM*01
 BUEHLER C., BOSSE M., MCMILLAN L., GORTLER S., COHEN M.:
 Unstructured lumigraph rendering.
 In SIGGRAPH '01 (2001), pp. 425-432.
BCF*05
 BEHRENDT S., COLDITZ C., FRANZKE O., KOPF J., DEUSSEN O.:
 Realistic real-time rendering of landscapes using billboard clouds.
 Computer Graphics Forum 24, 3 (2005), 507-516.
CCST00
 CHAI J.-X., CHAN S.-C., SHUM H.-Y., TONG X.:
 Plenoptic sampling.
 In SIGGRAPH '00 (New York, N.Y., USA, 2000), ACM Press/Addison-Wesley Publishing Co., pp. 307-318.
CTMS03
 CARRANZA J., THEOBALT C., MAGNOR M. A., SEIDEL H.-P.:
 Free-viewpoint video of human actors.
 In SIGGRAPH '03 (2003), pp. 569-577.
dAST*08
 DE AGUIAR E., STOLL C., THEOBALT C., AHMED N., SEIDEL H.-P., THRUN S.:
 Performance capture from sparse multi-view video.
 In SIGGRAPH '08 (2008), pp. 1-10.
DDS03
 DÉCORET X., DURAND F., SILLION F. X.:
 Billboard clouds.
 In SCG '03 (2003), pp. 376-376.
DTM96
 DEBEVEC P. E., TAYLOR C. J., MALIK J.:
 Modeling and rendering architecture from photographs: A hybrid geometry- and image-based approach.
 SIGGRAPH'96 (1996), 11-20.
EBMM03
 EFROS A. A., BERG A. C., MORI G., MALIK J.:
 Recognizing action at a distance.
 In ICCV (2003), pp. 726-733.
Eye09
 EYEVISION:
 http://www.ri.cmu.edu/events/sb35/tksuperbowl.html (2009).
GEJ*08
 GAMMETER S., ESS A., JAEGGLI T., SCHINDLER K., LEIBE B., GOOL L. J. V.
 Articulated multi-body tracking under egomotion.
 In ECCV (2) (2008), pp. 816-830.
GGSC96
 GORTLER S. J., GRZESZCZUK R., SZELISKI R., COHEN M. F.:
 The lumigraph.
 In SIGGRAPH '96 (1996), pp. 43-54.
GKH09
 GUILLEMAUT J.-Y., KILNER J., HILTON A.:
 Robust graph-cut scene segmentation and reconstruction for free-viewpoint video of complex dynamic scenes.
 In ICCV (Kyoto, Japan, September 2009).
GM03
 GOLDLUECKE B., MAGNOR M.:
 Real-time microfacet billboarding for free-viewpoint video rendering.
 In ICIP'03 (2003), vol. 3, pp. 713-716.
GTH*07
 GRAU O., THOMAS G. A., HILTON A., KILNER J., STARCK J.:
 A robust free-viewpoint video system for sport scenes.
 In Proceedings of the 3DTV Conference (April 2007).
HDK07
 HORNUNG A., DEKKERS E., KOBBELT L.:
 Character animation from 2D pictures and 3D motion data.
 ACM Transactions on Graphics 26, 1 (2007).

HS06
  HAYASHI K., SAITO H.:
  Synthesizing free-viewpoint images from multiple view videos in soccer stadium.
  In CGIV (2006), pp. 220-225.
JKMG07
  JAEGGLI T., KOLLER-MEIER E., GOOL L. J. V.:
  Learning generative models for monocular body pose estimation.
  In ACCV (1) (2007), pp. 608-617.
KSHG07
  KILNER J., STARCK J., HILTON A., GRAU O.:
  Dual-mode deformable models for free-viewpoint video of sports events.
  3dim (2007), 177-184.
LBDGG05
  LEE O., BHUSHAN A., DIAZ-GUTIERREZ P., GOPI M.:
  Capturing and view-dependent rendering of billboard models.
  In ISVC (2005), pp. 601-606.
LCF00
  LEWIS J. P., CORDNER M., FONG N.:
  Pose space deformation: a unified approach to shape interpolation and skeleton-driven deformation.
  In SIGGRAPH '00 (2000), pp. 165-172.
LH96
  LEVOY M., HANRAHAN P.:
  Light field rendering.
  In SIGGRAPH '96 (1996), pp. 31-42.
MBR*00
  MATUSIK W., BUEHLER C., RASKAR R., GORTLER S. J., MCMILLAN L.:
  Image-based visual hulls.
  In SIGGRAPH '00 (2000), pp. 369-374.
MHM*09
  MAHAJAN D., HUANG F.-C., MATUSIK W., RAMAMOORTHI R., BELHUMEUR P. N.:
  Moving gradients: a path-based method for plausible image interpolation.
  ACM Trans. Graph. 28, 3 (2009).
Mid09
  Middlebury multi-view stereo evaluation.
  http://vision.middlebury.edu/mview/, October 2009.
NAS09
  NASA:
  Anthropometry and biomechanics.
  http://msis.jsc.nasa.govisectionsisection03.htm (2009).
PG08
  PEKELNY Y., GOTSMAN C.:
  Articulated object reconstruction and markerless motion capture from depth video.
  Comput. Graph. Forum 27, 2 (2008), 399-408.
RMD04
  RECHE A., MARTIN I., DRETTAKIS G.:
  Volumetric reconstruction and interactive rendering of trees from photographs.
  SIGGRAPH'04 23, 3 (July 2004).
SGwHS98
  SHADE J., GORTLER S., WEI HE L., SZELISKI R.:
  Layered depth images.
  In SIGGRAPH'98 (1998), pp. 231-242.
Tho06
  THOMAS G.:
  Real-time camera pose estimation for augmenting sports scenes.
  Visual Media Production, 2006. CVMP 2006. 3rd European Conference on (2006), 10-19.
VBMP08
  VLASIC D., BARAN I., MATUSIK W., POPOVIC J.:
  Articulated mesh animation from multi-view silhouettes.
  In SIGGRAPH '08 (2008), pp. 1-9.
WWG07
  WASCHBÜSCH M., WÜRMLIN S., GROSS M.:
  3d video billboard clouds.
  Computer Graphics Forum 26, 3 (2007), 561-569.
YSK*02
  YAMAZAKI S., SAGAWA R., KAWASAKI H., IKEUCHI K., SAKAUCHI M.:
  Microfacet billboarding.
  In EGRW '02 (2002), pp. 169-180.

List of Designations
1 3D model
2 joint
3 link
4 articulated object model
5 projection surface
6 billboard
7 billboard fan
8 scene
9, 9' source camera
10, 10' source image
11 virtual camera
12 virtual image
13, 13a, 13b source image segment
14 real world object
15 processing unit
16 storage unit
17 transmitter
18 video display device
19 workstation

The invention claimed is:

1. A computer-implemented method for estimating a pose of an articulated object model, wherein the articulated object model is a computer based 3D model that is executed on a digital computer or a computer system comprising a computer memory and a processing unit coupled to the computer memory, wherein the computer based 3D model is of a real world object observed by one or more source cameras, and the articulated object model represents a plurality of joints and of links that link the joints, and wherein the pose of the articulated object model is defined by the spatial location of the joints, the method comprising the steps of:

obtaining at least one source image from a video stream comprising a view of the real world object recorded by a source camera;

processing by the processing unit the at least one source image to extract a corresponding source image segment comprising the view of the real world object separated from the image background;

maintaining, in a database in computer readable form, a set of reference silhouettes, each reference silhouette being associated with an articulated object model and with a particular reference pose of this articulated object model;

comparing by the processing unit the at least one source image segment to the reference silhouettes and selecting a predetermined number of reference silhouettes by taking into account, for each reference silhouette, wherein the processing unit determines a matching error that indicates how closely the reference silhouette matches the source image segment and/or wherein the processing unit determines a coherence error that indicates how much the reference pose is consistent with the pose of the same real world object as estimated from at least one of preceding and following source images of the video stream;

retrieving by the processing unit the reference poses of the articulated object models associated with the selected of reference silhouettes; and computing by the processing unit an estimate of the pose of the articulated object model from the reference poses of the selected reference silhouettes.

2. The computer-implemented method of claim 1, wherein the step of comparing the at least one source image segment to the reference silhouettes comprises the steps of, for each reference silhouette that the source image segment is compared to:

determining a projective transform that maps the source image segment onto the reference silhouette, in particular by scaling the source image segment to be of the same size as the reference silhouette; and computing the matching error as either being proportional to the relative size of the image area in which the mapped source image segment and the reference silhouette do not overlap, or as being a measure of a distance between the outlines of the scaled source image segment and of the reference silhouette, with the matching error optionally also being dependent on parameters of the projective transform;

and using this matching error as a measure for how closely the source image segment and the reference silhouette match.

3. The computer-implemented method of claim 2, wherein the step of scaling is accomplished by re-sampling either the source image segment or the reference silhouettes or both to have bounding boxes of the same pixel size, and both the source image segment and the reference silhouette are represented by binary images having the same pixel dimension, and computing the error value by counting the number of corresponding pixels from the source image segment and the reference silhouette that differ in value.

4. The computer-implemented method according to claim 1, wherein the step of comparing the at least one source image segment to the reference silhouettes comprises the steps of, for each reference silhouette that the source image segment is compared to:

retrieving the pose of the same real world object estimated from a preceding source image of the video stream;

computing the coherence error as being proportional to the difference between this preceding pose estimate and the reference pose of the reference silhouette, and using this coherence error as a measure of consistency with the preceding source image.

5. The computer-implemented method according to claim 1, wherein the step of computing an estimate of the pose of the articulated object model from the reference poses of the selected reference silhouettes further comprises:

repeating the preceding steps for one or more further source images from one or more further video streams from further source cameras, each further source image comprising a view of the same real world object having been recorded at the same time but from a different viewpoint, thereby obtaining for each further source image a predetermined number of selected reference silhouettes and associated selected reference poses;

performing an optimization to select for each source image a most plausible reference pose, by computing for each combination of selected reference poses for the different source images a total joint consistency measure by, projecting the joints of the selected reference poses of this combination into 3D space, estimating a 3D position of the joints and computing, for each joint, a joint consistency measure that expresses how well the estimated 3D joint position matches the projection of the joint from the selected reference poses;

combining the joint consistency measures of all joints to obtain the total joint consistency measure;

selecting the combination of reference poses for the different source images that optimizes the total joint consistency measure.

6. The computer-implemented method of claim 5, wherein the step of performing an optimization further comprises the step of varying and optimizing a 2D offset of each silhouette in the plane of its associated source image in order to correct for source camera calibration errors.

7. The computer-implemented method of claim 1, comprising the further step of displaying, on a display device, at least one source image with estimated joint positions superimposed over the source image and accepting a user input for interactively modifying one or more joint positions.

8. A computer-implemented method according to claim 1, wherein, in order to determine a 3D pose matching a given 2D pose associated with a source image, the following steps are performed:

computing, from the given 2D pose an approximate 3D pose comprising approximate joint positions whose projection approximately matches the positions of the corresponding joints of the 2D pose when projected into the image plane of the source image associated with the 2D pose;

modifying the approximate 3D pose to exactly match the 2D pose by, for each joint, moving the position of the joint from the approximate 3D joint position to a position defined by the intersection of a ray passing from the camera through the joint position in the source image with a plane parallel to the image plane of the source image and passing through the approximate 3D joint position.

9. A computer-implemented method for estimating a pose of an articulated object model, wherein the articulated object model is a computer based 3D model that is executed on a digital computer or a computer system comprising a computer memory and a processing unit coupled to the computer memory, wherein the computer based 3D model is of a real world object observed by two or more source cameras, and the articulated object model represents a plurality of joints and of links that link the joints, and wherein the pose of the articulated object model is defined by the spatial location of the joints, called 3D joint positions, the method comprising the steps of determining by the processing unit an initial estimate of the 3D pose, that is, the 3D joint positions of the articulated object model;

associating by the processing unit each link with one or more projection surfaces, wherein the projection surfaces are surfaces defined in the 3D model, and the position and orientation of each projection surface is determined by the position and orientation of the associated link;

iteratively adapting the 3D joint positions by the processing unit, for each joint, wherein the processing unit determines a position score assigned to its 3D joint position, the position score being a measure of the degree to which image segments from the different source cameras, when projected onto the projection surfaces of links adjacent to the joint, are consistent which each other;

wherein the processing unit varies the 3D joint position of the joint until an optimal position score is achieved;

repeating the step of iteratively adapting the 3D joint positions for all joints for a predetermined number of times or until the position scores converge.

10. The computer-implemented method of claim 9, wherein the step of varying the 3D joint position of the joints varies the 3D joint positions subject to anthropometric constraints, the anthropometric constraints being at least one of:

the joint is on or above the ground;

lengths of topologically symmetric links do not differ more than 10%;

the lengths of links are within anthropometric standards;

distances between joints not connected by a link are within anthropometric standards.

11. The computer-implemented method of claim 9, wherein the projection surfaces, for each link, comprise a fan of billboards, each billboard being associated with a source camera, and each billboard being a planar surface spanned by its associated link and a vector that is normal to both this link and to a line connecting a point of the link to the source camera.

12. Currently Amended) The computer-implemented method of claim 9, wherein the position score of a 3D joint position of a joint is computed by the steps of, for each link adjacent to the joint, projecting the images from the different source cameras onto the associated projection surfaces of the link and from there into a virtual image as seen by a virtual camera;

for an area that correspond to the projection of these projection surfaces into the virtual image, computing a partial position score for this link according to the degree to which the image segments from the different source cameras overlap and have a similar colour;

combining the partial position scores to obtain the position score.

13. The computer-implemented method of claim 12, wherein computing and combining the partial position score comprises the steps of:

computing the partial position score for each pair of source cameras contributing to the virtual image;

combining these partial position scores by adding them, weighing each partial position score according to the angle between the viewing directions of the associated pair of source cameras.

14. A computer-implemented method for rendering a virtual image as seen from a virtual camera, given an articulated object model, wherein the articulated object model is a computer based 3D model that is executed on a digital computer or a computer system comprising a computer memory and a processing unit coupled to the computer memory, wherein the computer based 3D model is of a real world object observed by two or more source cameras, and the articulated object model represents a plurality of joints and of links that link the joints, and wherein the pose of the articulated object model is defined by the spatial location of the joints, the method comprising the steps of:

determining by the processing unit an estimate of the 3D pose, that is, the 3D joint positions of the articulated object model;

associating by the processing unit each link with one or more projection surfaces, wherein the projection surfaces are surfaces defined in the 3D model, and the position and orientation of each projection surface is determined by the position and orientation of the associated link;

wherein the projection surfaces, for each link, comprise a fan of billboards, each billboard being associated with a source camera, and each billboard being a planar surface spanned by its associated link and a vector that is normal to both this link and to a line connecting a point of the link to the source camera;

for each source camera, projecting segments of the associated source image onto the associated billboard, creating billboard images;

for each link, projecting the billboard images into the virtual image and blending the billboard images to form a corresponding part of the virtual image.

15. A computer-implemented method for determining a segmentation of a source image segment, the method comprising the steps of:

obtaining at least one source image from a video stream comprising a view of a real world object recorded by a source camera;

processing by a processing unit the at least one source image to extract a corresponding source image segment comprising the view of the real world object separated from the image background;

maintaining, in a database in computer readable form, a set of reference silhouettes, each reference silhouette being associated with a reference segmentation, the reference segmentation defining sub-segments of the reference silhouette, each sub-segment being assigned a unique label;

determining by the processing unit a matching reference silhouette which most closely resembles the source image segment and retrieving the reference segmentation of the reference silhouette;

for each sub-segment, overlaying both a thickened and a thinned version of the sub-segment over the source image segment and labelling the source image pixels which lie within both the thickened and the thinned version with the label of the sub-segment;

labelling all remaining pixels of the source image segment as unconfident pixels;

for each sub-segment, determining by the processing unit a colour model that is representative of the colour of the pixels labelled with the sub-segment's label;

labelling the unconfident pixels according to the colour model, by assigning each of the unconfident pixel to a sub-segment whose colour model most closely fits the colour of each of the unconfident pixels.

* * * * *